March 30, 1965  SOICHIRO HONDA  3,175,637
MOTOR VEHICLE WITH INDEPENDENTLY MOUNTED DRIVE
WHEELS AND LOAD CARRIER THEREBETWEEN
Filed May 28, 1963  2 Sheets-Sheet 1

INVENTOR:
SOICHIRO HONDA
BY E. M. Squire
ATTORNEY.

March 30, 1965  SOICHIRO HONDA  3,175,637
MOTOR VEHICLE WITH INDEPENDENTLY MOUNTED DRIVE
WHEELS AND LOAD CARRIER THEREBETWEEN
Filed May 28, 1963  2 Sheets-Sheet 2

INVENTOR:
SOICHIRO HONDA
BY E. M. Squire
ATTORNEY.

United States Patent Office 3,175,637
Patented Mar. 30, 1965

3,175,637
MOTOR VEHICLE WITH INDEPENDENTLY MOUNTED DRIVE WHEELS AND LOAD CARRIER THEREBETWEEN
Soichiro Honda, 4800 Oh-aza Shimoniikura, Yamato-machi, Kita-Adachi-gun, Saitama-ken, Japan
Filed May 28, 1963, Ser. No. 283,839
Claims priority, application Japan, June 2, 1962, 37/22,603
2 Claims. (Cl. 180—72)

This invention relates to motor vehicles and more particularly to those of the type including at least one pair of right and left drive wheels which are driven from a power plant through a differential gear unit.

The present invention has for its object to provide a novel driving arrangement for such motor vehicles in which a large free space is formed between the drive wheels so that a spacious trunk or baggage floor may be accommodated in the space.

According to the present invention, there is provided a motor vehicle of the type described which comprises a pair of transmission housings secured at one end to the opposite sides of the differential housing, relatively short axles for the drive wheels and journaled in said respective transmission housings at the other free end thereof, and transmission units for power transmission between the differential unit and said respective axles and enclosed by said respective transmission housings, the arrangement being such that a large space is formed between the drive wheels clear of said transmission units.

The above and other objects, features and advantages of the present invention will become apparent from the following description when taken in conjunction with the accompanying drawings, in which.

Figure 1:
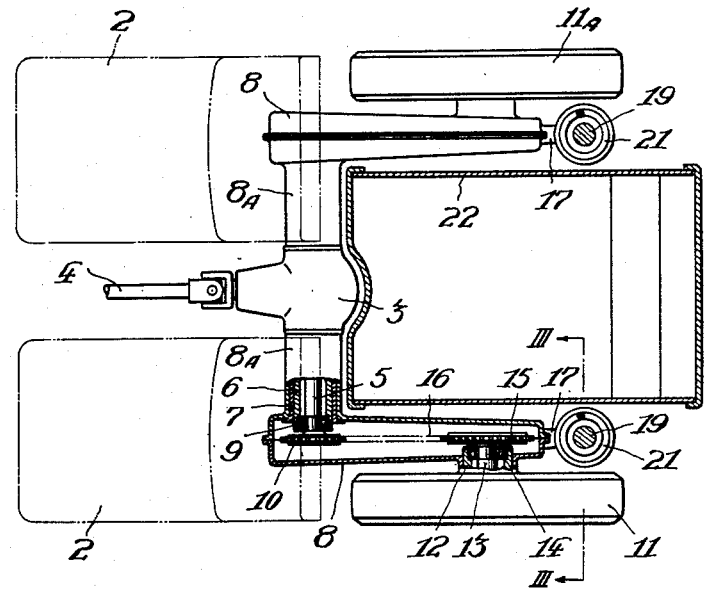
FIG. 1 is a fragmentary plan view, partly in section, of a motor vehicle embodying the present invention.
Figure 2:
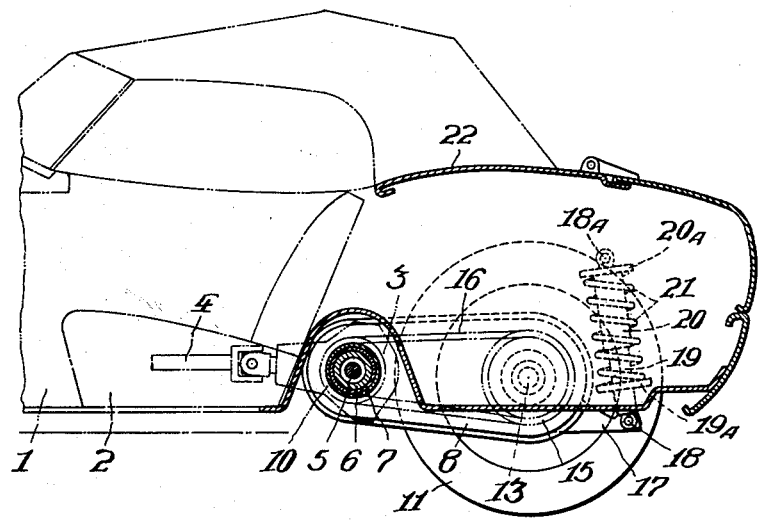
FIG. 2 is a cross-sectional side elevation of the embodiment.
Figure 3:
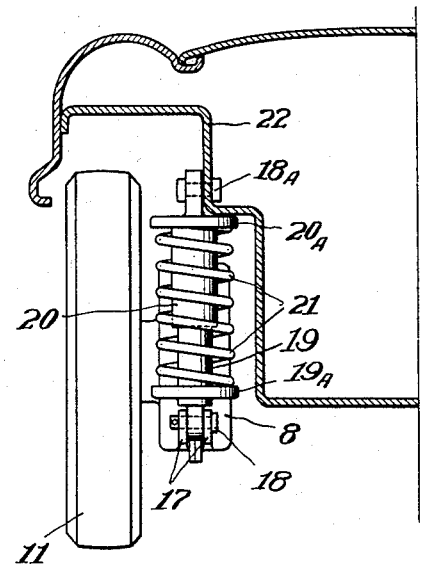
FIG. 3 is an enlarged vertical cross section taken along the line III—III in FIG. 1.

Referring to the drawings, there is shown a motor vehicle having a body providing a driver's cab 1 including seats 2. The space behind the seats 2 is usually not made use of so efficiently except that a differential gear unit 3 is installed therein. An input shaft or so-called propelling shaft 4 is connected to the front end of the differential unit, which comprises two axially aligned drive shafts 5 extending laterally outwardly. The differential unit 3 is enclosed by a housing carried by the vehicle body and having tubular arms 6 extending from the opposite sides thereof in alignment with each other (FIG. 1). The tubular arms 6 each have a bearing sleeve 7 mounted on the outer end thereof and a transmission housing 8 having a laterally inwardly extending tubular projection 8A is pivotally secured to the differential housing with the tubular projection 8A fitted over the adjacent tubular arm 6 thereof. A bearing unit 9 is fitted in each of the tubular arms 6 at the outer end thereof to support one of the associated drive shafts 5 of the differential unit. A sprocket wheel 10 is secured to the outer end of the drive shaft 5 extending outwardly through the bearing unit 9. The outside wall of each of the transmission housings 8 carries a tubular support 12 adjacent to the free or rear end thereof. Drive wheels 11, 11A are each mounted fast on a short axle 13 extending inwardly therefrom and journaled in the adjacent tubular support 12 by a bearing unit 14. A second chain sprocket wheel 15 is mounted on the inner end of the axle 13 and connected with the first-mentioned sprocket wheel 10 by means of a drive chain 16.

A bracket 17 extends rearwardly from each of the transmission housings 8 and a telescopic unit is pivoted at one end to the bracket 17 as indicated at 18. The other end of the telescopic unit is pivoted as at 18A to a portion of the vehicle body and for example to the frame 22 of a trunk or baggage compartment arranged between the drive wheels. The telescopic unit includes a pair of inner and outer tubular members 19 and 20 which are telescopically fitted to each other and each carries a dished seat 19A or 20A adjacent the pivotal end. As shown, a cushioning spring 21 is arranged to encircle the telescopic unit between the dished seats 19A and 20A. It is obvious that the same arrangement is made for both right and left drive wheels 11 and 11A.

According to the present invention, the motor vehicle has no drive wheels arranged directly on the opposite sides of the differential unit but has a pair of transmission housings 8 extending from the opposite sides of the differential unit 3 and relatively short axles 12 carrying respective drive wheels 11 and 11A are journaled in the respective transmission housings 8 at the free extremity thereof with the differential unit 3 located at a point otherwise practically unutilizable. With this arrangement, it will be appreciated that a large free space is readily obtainable between the two drive wheels 11 and 11A, which can readily be utilized, for example, for accommodation of a trunk or baggage compartment. In addition to this important advantage, the pivotal arrangement of the transmission housings 8 relative to the differential housing and including the cushioning springs 21 associated with the respective transmission housings 8 really makes for independent suspension of the drive wheels 11 and 11A, which is effective to reduce the vibration of the vehicle and thus increase the driving comfort.

What is claimed is:
1. A motor vehicle comprising a pair of drive wheels, a differential unit enclosed by a housing, a pair of elongated transmission housings each pivotally secured at one end to one side of said differential housing, a pair of short axles, each supporting one of said drive wheels, each axle being journaled in one of said transmission housings at the free end thereof, power transmission means connected for power transmission between said differential unit and each of said short axles, said power transmission means being enclosed within said transmission housings, and load carrying means having a generally horizontally extending bottom wall normally located below said short axles, a front wall extending upwardly from said bottom wall adjacent to said transmission unit, and two laterally spaced side walls each extending upwardly past the inner end of one of said short axles.

2. A motor vehicle comprising a body, a pair of drive wheels, a differential unit enclosed by a housing, said housing being carried by said body, a pair of elongated transmission housings each pivotally secured at one end to one side of said differential housing, a pair of short axles each supporting one of said drive wheels, each axle being journaled in one of said transmission housings at the free end thereof, power transmission means connected for power transmission between said differential unit and each of said short axles, said power transmission means being enclosed within said transmission housings, load carrying means included in said body and having a generally horizontally extending bottom wall normally located below said short axles, a front wall extending upwardly from said bottom wall adjacent to said transmission unit, and two laterally spaced side walls each extending upwardly past the inner end of one of said short axles, and a pair of resilient means spaced laterally outwardly of said side walls, said resilient means each being connected between said body and the free end portion of one of said transmission housings for compression by a load carried by said load carrying means.

References Cited by the Examiner

UNITED STATES PATENTS

| | | | |
|---|---|---|---|
| 1,858,782 | 5/32 | Masury | 180—72 |
| 1,858,784 | 5/32 | Masury | 180—72 |
| 2,024,199 | 12/35 | Barnes et al. | 180—72 |
| 2,091,509 | 8/37 | Kramer | 180—72 |
| 2,208,710 | 7/40 | Tjaarda | 180—65 |

FOREIGN PATENTS

| | | |
|---|---|---|
| 570,008 | 2/33 | Germany. |
| 806,516 | 9/36 | France. |

A. HARRY LEVY, *Primary Examiner*.